Patented Nov. 7, 1944

2,362,336

UNITED STATES PATENT OFFICE 2,362,336

SULPHONAMIDE DERIVATIVES OF 2-AMINO-OXAZOLE AND PROCESSES FOR THEIR PRODUCTION

George W. Anderson, Stamford, Conn., assignor to American Cyanamid Company, New York, N. Y., a corporation of Maine No Drawing. Application July 31, 1942, Serial No. 453,046

8 Claims. (Cl. 260—239.6)

This invention relates to a new class of chemical compounds and methods for their preparation. More particularly it relates to sulphonamide derivatives of 2-aminooxazole.

This new class of chemical compounds may be represented by the following formula:

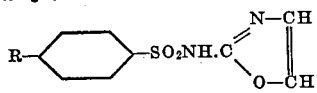

in which R represents an amino group or a group reducible to an amino group including nitro groups.

Some of the compounds of this invention have bactericidal properties and hence may be used for that purpose. They may also be used as intermediates for the preparation of other compounds such as pharmaceuticals and particularly azo dyestuffs.

Compounds of the present invention, in general, may be prepared by reacting a p-substituted benzenesulphonyl halide with 2-aminooxazole in which the p-substituent is a group reducible to an amino group, such as a nitro group. These reaction products may then be converted into the compounds of the general formula in which R is an amino group by reduction. Preferably the reaction between 2-aminooxazole and the sulphonyl halide is carried out in a medium comprising an organic liquid, such as acetone, isopropyl alcohol, tertiary butyl alcohol, dioxane, or the like. In this reaction a hydrogen halide is liberated and in some instances it may be desirable to provide a basic reaction medium which will react with the hydrogen halide evolved. This may be effected by carrying out the reaction in a suitable medium and adding an excess of sodium hydroxide or other alkali metal hydroxide. In some instances the reaction can be carried out in the presence of a basic reaction medium, such as pyridine, trimethylamine, or quinoline, in which case it is not necessary to add an alkali hydroxide.

The invention will be described more fully in conjunction with the following specific examples. It should be understood, however, that the examples are given by way of illustration only and the invention is not to be limited by the details set forth therein. The parts are by weight except in the case of liquids which are expressed in parts by volume.

EXAMPLE 1

*p-Nitrobenzenesulphonamidooxazole*

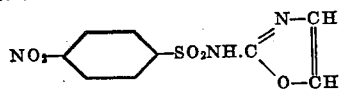

16.2 parts of 2-aminooxazole are dissolved in 100 cc. of dry acetone and a solution of 42.8 parts of p-nitrobenzenesulphonyl chloride in 100 cc. of acetone is added. A yellow precipitate soon forms. 23.7 parts by volume of dry pyridine are added. The mixture is refluxed and stirred for thirty minutes during which the solid dissolves. Most of the acetone is distilled off. Then 100 parts of water are added to the thick brown residue, all is stirred and chilled and the water layer is poured off.

The gummy residue is stirred with two portions of 100 parts of water plus 15 parts of concentrated ammonium hydroxide each. The insoluble part is discarded.

Hydrochloric acid is carefully added to the alkaline solution. The sticky precipitate which first forms is removed and discarded. On adding more acid, a yellow solid precipitates. This is filtered off after cooling and recrystallized from water several times, using decolorizing carbon. Light yellow crystals of pure p-nitrobenzenesulphonamidooxazole are obtained.

In place of acetone, isopropyl alcohol, tertiary butyl alcohol, or dioxane may be used as the reaction medium.

EXAMPLE 2

*2-Sulphanilamidooxazole*

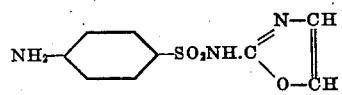

4.7 parts of the nitro compound obtained above are dissolved in 50 parts of water and 20 parts of concentrated ammonium hydroxide. This solution is added to a nearly boiling solution of 33.8 parts of ferrous sulphate heptahydrate in 65 parts of water. Heating is continued and enough additional ammonium hydroxide is added to keep the mixture alkaline. After several minutes of boiling, the black precipitate which forms is filtered off and washed with dilute ammonium hydroxide.

The filtrates are stirred with decolorizing carbon and filtered. Then acetic acid is added to a maximum precipitate of 2-sulphanilamidooxazole. The compound is purified by stirring in dilute hydrochloric acid solution with charcoal, filtering and precipitating by careful neutralization with ammonium hydroxide.

In Example 1 above p-nitrobenzenesulphonyl chloride was used in carrying out the reaction and is preferred, but it is to be understood that instead thereof the corresponding sulphonyl bromides may be employed. The p-nitro compounds thus obtained may be reduced to the p-amino compounds by any one of several reduction methods well known in the art.

When desired, the alkali metal, alkaline earth metal, or other metal salts of 2-sulphanilylaminooxazole may be prepared in accordance with the procedures normally employed for preparing salts of sulphonamides. The alkali metal and alkaline earth metal salts, for example, may be prepared by direct treatment with the appropriate alkali metal or alkaline earth metal hydroxide. The alkali metal salts may then, if desired, be converted into salts of heavy metals, such as iron, copper, gold, etc., by treatment with water-soluble inorganic salts of the appropriate metal.

It is obvious that the above description and examples are intended to be illustrative only and that they may be varied or modified to a considerable extent without departing from the spirit of the invention or sacrificing the advantages thereof. I do not, therefore, intend to limit myself to the specific embodiments herein set forth except as indicated in the appended claims.

What I claim is:

1. A compound of the group consisting of those represented by the following formula and salts thereof:

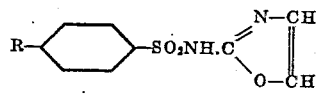

in which R is a member of the group consisting of amino radicals and radicals reducible to an amino group.

2. The compound represented by the following formula:

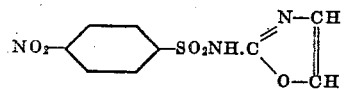

3. The compound represented by the following formula:

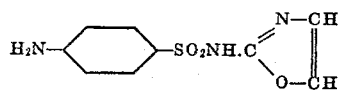

4. The process which comprises reacting 2-aminooxazole with a p-nitrobenzenesulphonyl halide to give p-nitrobenzenesulphonamidooxazole.

5. The process which comprises reacting 2-aminooxazole with a p-nitrobenzenesulphonyl halide to give p-nitrobenzenesulphonamidooxazole and subsequently reducing the p-nitro group to a p-amino group.

6. The process which comprises reacting 2-aminooxazole with p-nitrobenzenesulphonyl chloride to give p-nitrobenzenesulphonamidooxazole.

7. The process which comprises reacting 2-aminooxazole with p-nitrobenzenesulphonyl chloride to give p-nitrobenzenesulphonamidooxazole and subsequently reducing the p-nitro group to a p-amino group.

8. The process which comprises reducing p-nitrobenzenesulphonamidooxazole to give 2-sulphanilamidooxazole.

GEORGE W. ANDERSON.